C. & G. S. Dilkes,
Reciprocating Saw Mill.

N° 15,689.   Patented Sep. 9, 1856.

Witnesses:
Wm. Munson
Mo. M. Kinsey

Inventor:
Calvin Dilkes
George S. Dilkes

UNITED STATES PATENT OFFICE.

C. DILKES AND G. S. DILKES, OF ALLOWAYSTOWN, NEW JERSEY.

METHOD OF FEEDING SAWING-MILLS.

Specification of Letters Patent No. 15,689, dated September 9, 1856.

*To all whom it may concern:*

Be it known that we, CALVIN DILKES and GEORGE S. DILKES, both of Allowaystown, in the county of Salem and State of New Jersey, have invented a new and useful Improvement in the Apparatus for Operating the Feed-Wheel of Sawmills; and we do hereby declare that the following is a full, clear, and exact description of the construction and operation of the same, reference being had to the annexed drawings, making a part of this specification, in which—

Figure 1:
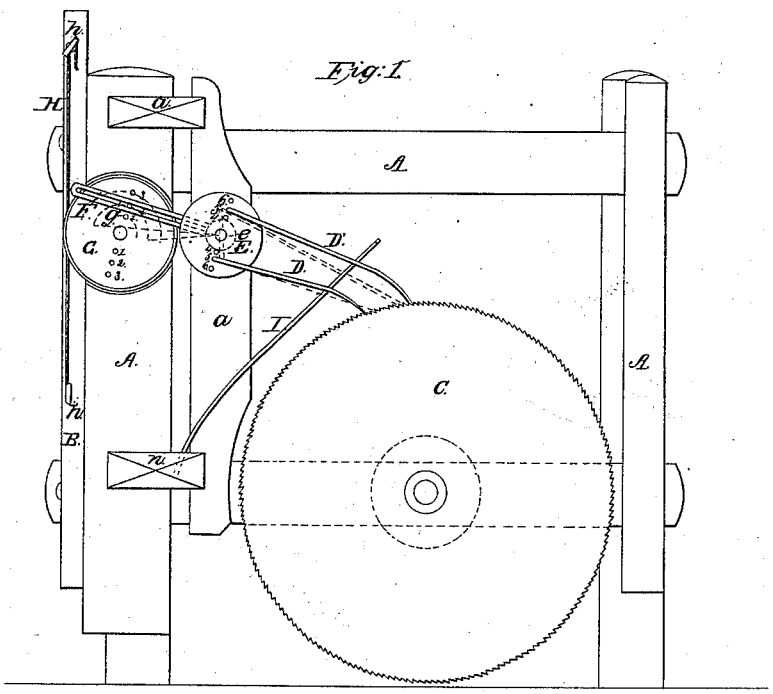
Figure 2:
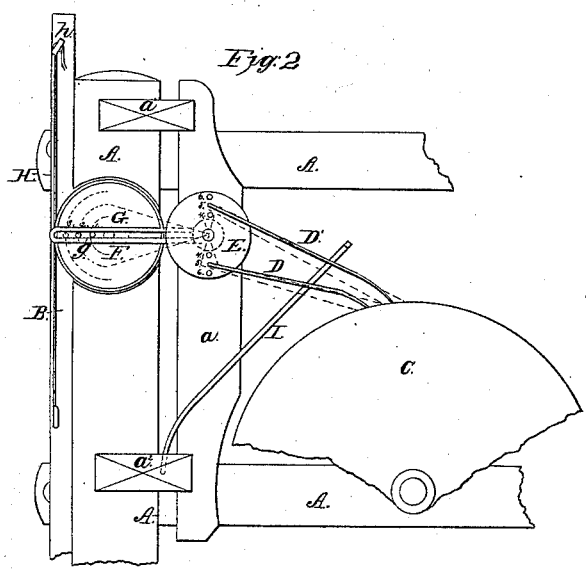

Figures 1 and 2 represent a side view of the improved apparatus in two different positions, as applied.

Like letters in both figures indicating the same objects.

The nature of our invention consists in giving motion to the pawls which actuate the feed wheel by means of a cord and pulley or short cylinder operating together, in combination with a slotted arm of the lever to which the said pawls are attached; whereby any required extent or velocity of motion may at pleasure be given to the feed wheel in a steady and even manner, and so that the feed motion may be readily and instantly diminished when the saw comes in contact with knots in the timber.

Referring to the drawings A—A, is the mill frame; B, the saw frame; C the feed wheel; D and D′ the pawls; E, a plate to which the pawls are attached, and which is supported in a vertical position, upon journals ($e$), and has a slotted arm (F) fixed so as to project radially therefrom. G is the short cylinder or pulley connecting adjustably with the said slotted arm (F) by means of a stud ($g$) which projects perpendicularly from its plane; and H. is the cord which gives rotary motion to the said pulley—it being passed once around the same, and each end ($h$ and $h'$) thereof attached to the saw frame, so that the latter moves up and down, a right and left alternating rotary motion is given to the said pulley, its journal turning in the upright post which supports the saw frame. The circumference of this pulley or short cylinder (G) is exactly equal to twice the length of motion given to the saw frame (B), so that it is turned but half around on its journal at each upward or downward full motion of the latter. The stud ($g$) is made cylindrical and so as to be inserted securely in any one of a series of holes (1, 2, 3,) which are made in the pulley, and also so as to work smoothly in the slot of the lever (F), as the pulley is operated by means of the cord (H), and thus cause an alternate rising and falling of the lever arm (F). The pawls (D and D′) are formed each with a cylindrical stud at its inner end, which fits so as to work as a joint in any one of a series of holes (4, 5, 6,) which are made on each side of the center of the lever plate E; and the said lever plate is supported on its journals, or fulcra, between two upright pieces ($a$) of the frame, which pieces are fixed to the cross-timbers ($a'$ and $a^2$).

I, is a stay or guard which prevents the pawls from slipping off the wheel (C).

The cord (H) is made of raw-hide, and is looped to a hook or staple ($h'$) at its lower end, and wound around a friction pin ($h$) at the upper end so that it can be loosened or tightened around the pulley (G) as occasion may require.

The pulley (G) and plate (E) are both made of cast-iron; and the lever (F) of wrought-iron. The stud ($g$) is made of wrought-iron, but may have a brass friction-collar over it, if required, to diminish the friction in the slot of the lever, in a well known manner.

Operation: The cord (H) being tightened around the pulley (G) and the said pulley and the lever (F) being connected as described, it will be perceived, as in the saw frame (B) is moved its full extent either up or down, that the lever arm (F) will accordingly be carried by the stud ($g$), either up or down (as shown in Fig. 2), or both up and down (as shown in Fig. 1.), and that consequently the pawls (D and D′) will be caused to act alternately upon the feed wheel (C) and give it a feed motion in both cases; and that the velocity and extent of this motion can be regulated to suit any kind of timber, by simply changing the positions of the pawls to either of the holes (4, 5, 6,) of the plate E—or, the position of the stud ($g$) to either of the holes (1, 2, 3,) in the pulley (G); and that the position of the pulley itself may be adjusted, on loosening the cord (H), so as to bring the stud ($g$), when at the center or other point of its arc of oscillation, at any position whatever in radial relation to the fulcrum or journal of the lever plate (E), and consequently that the velocity and extent of motion of the pawls upon the feed wheel are capable of being varied to almost any degree as, for instance, when the pulley, G, is placed as in Fig. 1, the pawls will be moved alternately forward and backward at each rising or falling of the saw frame; and when placed as in Fig. 2, they will be moved only either alternately forward or backward at each rising or falling of the saw frame—as shown by the dotted red lines—and that there can be no deviation, rattling nor unsteadiness in its operation, after being adjusted to operate as described; and that as the feed motion is effected during the ascent as well as descent of the saw, by simply lifting one of the pawls as the saw is approached by a knot, for instance, the feed can be proportionately diminished, as is often required to prevent injury to the saw.

We do not claim operating the feed wheel by means of pawls operated by the saw frame through the medium of a lever—but

What we claim as our invention, and desire to secure by Letters Patent, is,

Giving motion to the pawls which actuate the feed wheel, by means of the cord (H) and pulley or short cylinder (G), and its stud (g), in combination with the slotted lever arm (F) and its plate (E)—the same being constructed, combined and operating together, substantially as set forth and described.

CALVIN DILKES.
GEORGE S. DILKES.

Witnesses:
 BEN. MORISON,
 JNO. B. KENNEY.